United States Patent [19]

Werner

[11] Patent Number: 4,464,545

[45] Date of Patent: Aug. 7, 1984

[54] ECHO CANCELLER

[75] Inventor: Jean J. Werner, Holmdel, N.J.

[73] Assignee: Bell Telephone Laboratories, Incorporated, Murray Hill, N.J.

[21] Appl. No.: 282,669

[22] Filed: Jul. 13, 1981

[51] Int. Cl.³ .............................................. H04B 3/20
[52] U.S. Cl. ................................................. 179/170.2
[58] Field of Search ............... 179/170.2, 170.6, 170.8; 375/38, 14

[56] References Cited

U.S. PATENT DOCUMENTS

| | | | |
|---|---|---|---|
| 3,903,377 | 9/1975 | Sato | 179/170.2 |
| 4,015,222 | 3/1977 | Werner | 332/9 |
| 4,084,137 | 4/1978 | Welti | 375/38 |
| 4,087,654 | 5/1978 | Mueller | 179/170.2 |
| 4,131,767 | 12/1978 | Weinstein | 179/170.2 |
| 4,162,378 | 7/1979 | Baudoux et al. | 179/170.2 |
| 4,247,940 | 1/1981 | Mueller et al. | 375/14 |
| 4,349,889 | 9/1982 | vanden Elzen et al. | 179/170.2 |
| 4,355,214 | 10/1982 | Levy et al. | 179/170.2 |

OTHER PUBLICATIONS

L. Auidoux; "Echo Canceller Structures for Data Signals;" 1981 International Conference on Communications; Jun. 1981; pp. 14.5.1–14.5.5.

Primary Examiner—G. Z. Rubinson
Assistant Examiner—Randall P. Myers
Attorney, Agent, or Firm—R. D. Slusky

[57] ABSTRACT

An echo canceller for passband data signals is comprised of a pair of real passband filters which generate samples of the echo replica in response to respective streams of rotated data symbol components.

14 Claims, 5 Drawing Figures

ECHO CANCELLER

Background of the Invention

The present invention relates to echo cancellers used in full-duplex, two-wire data transmission systems.

There are two principal techniques for transmitting data simultaneously in two directions, i.e., at full duplex, over a communications channel, such as a telephone link. One approach is to divide the bandwidth of the channel in half and use each half to carry the data in a particular transmission direction. Another approach—the one with which the present invention is concerned—is to use the entire bandwidth for each transmission direction and provide an echo canceller at each end of the channel.

The need for echo cancellers in telephone network data transmission, for example, arises because echoes of the signals transmitted from one end of the channel are returned thereto along with the desired signals transmitted from the other end of the channel. Such echoes result, for example, from hybrid leakage and hybrid impedance mismatches within the channel. Since the echo occupies the same frequency spectrum as the received signal (unlike the above-described frequency division approach), it corrupts the received signal thereby precluding accurate recovery of the far-end data. The echo canceller at the near end, operating, for example, in response to the stream of nearend data symbols, generates a replica of the echo energy in the signal received from the channel. The replica is subtracted from the received data signal to yield a data signal which is substantially echo free.

The circuitry which generates the echo replica is conventionally in the form of a transversal filter in which a predetermined number of the most recent near-end data symbols are multiplied by respective tap coefficients. The latter are periodically updated in response to a locally-generated error signal in such a way that as close a correspondence as possible is maintained between the echo replica and the actual echo energy in the received data signal.

SUMMARY OF THE INVENTION

In prior art echo cancellers used in passband data transmission systems, the echo replica is generated at baseband and then modulated into the passband so that it can be combined with the received passband data signal. In accordance with the present invention, by contrast, I have discovered that the echo replica can be generated in the passband directly via, for example, a pair of real bandpass filters. This approach is advantageous in that the the echo replica can be generated with substantially fewer arithmetic operations than in the prior art.

In illustrative embodiments of the invention disclosed herein, the passband data signals are conventional double-sideband, quadrature carrier signals. In such embodiments, the pair of bandpass filters respectively operate, in accordance with a feature of the invention, on rotated versions of the real and imaginary data symbol components.

DETAILED DESCRIPTION

Figure 1:
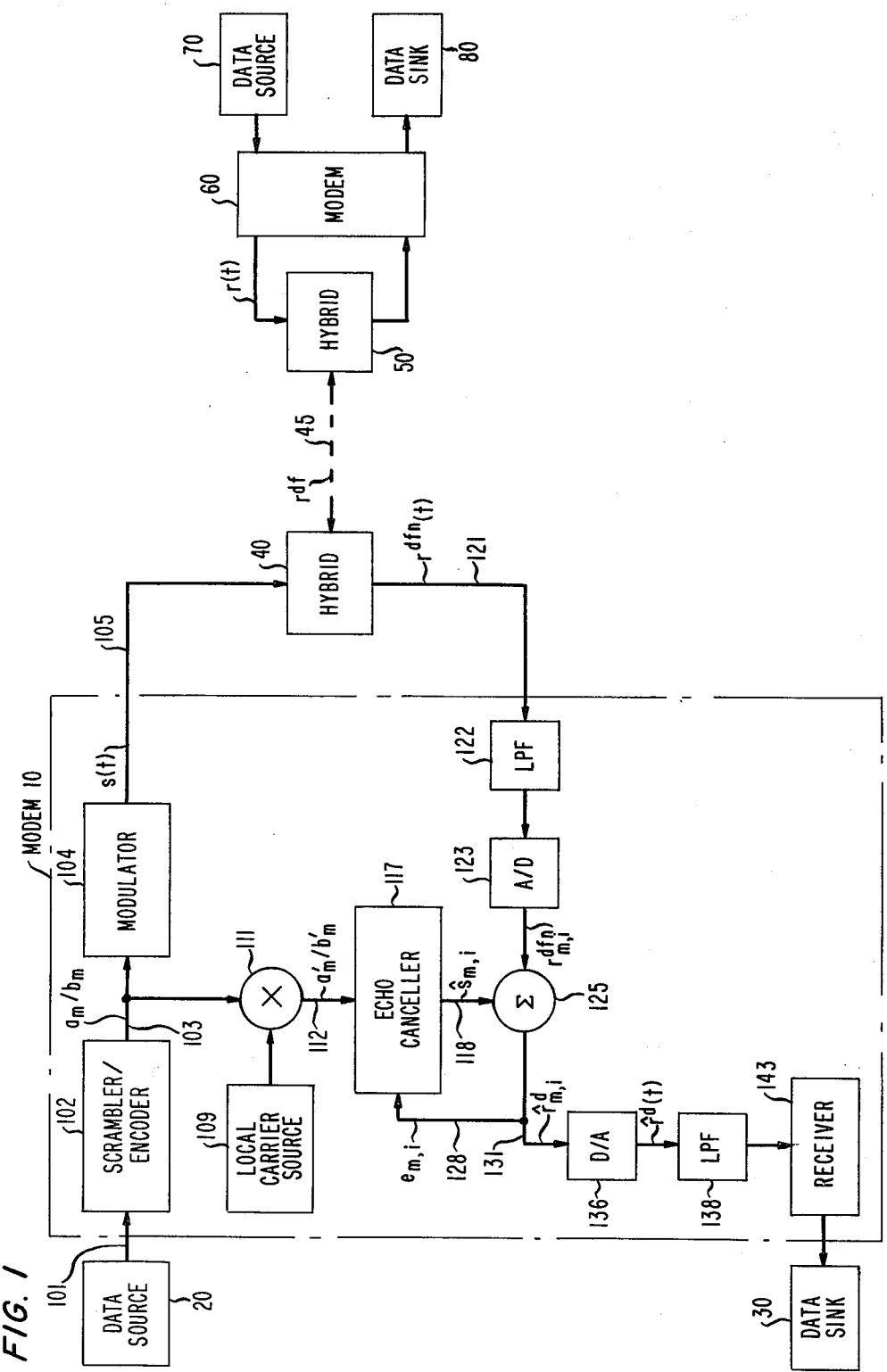
FIG. 1 is a block diagram of a data communication system utilizing the echo cancellation arrangement of the present invention.

Near-end modem 10 of FIG. 1 receives a stream of 4800 bit per second (bps) binary data from a data source 20 via lead 101. Within the modem, the binary data is scrambled and encoded in conventional fashion by scrambler/encoder 102. Once every T seconds, scrambler/encoder 102 generates a data symbol $A_m$. Symbol $A_m$ may be regarded as a complex number having real and imaginary components $a_m$ and $b_m$, respectively, each of which can take on one of two predetermined real values, illustratively ±1. Thus, for each pair of bits received from source 20, scrambler/encoder 102 generates a complex data symbol which can take on any one of the four complex values ±1±j. T is the so-called baud interval and is illustratively equal to 1/2400 sec. The baud index, m, thus advances at the baud rate of $1/T = 2400$ Hz.

Components $a_m$ and $b_m$ are extended to modulator 104 one after the other on lead 103. The modulator generates digital samples of a double sideband-quadrature carrier signal which are then converted to analog form and lowpass filtered, ultimately providing on the outbound leg 105 of a near-end four-wire loop a near-end double sideband-quadrature carrier analog passband data signal s(t) of the form $$s(t) = Re\left[ \sum_m (a_m + jb_m)g(t - mT)e^{j\omega_c t} \right] \quad (1)$$

where g(t) is the so-called Nyquist pulse and is a real function, and $\omega_c$ is the radian carrier frequency. Signal s(t), constituting the output signal of modem 10, passes to hybrid 40 and thence to a far-end hybrid 50 and far-end modem 60 via transmission channel 45. Far-end modem 60, which is substantially identical to near-end modem 10, recovers the transmitted binary data stream and applies it to a data sink 80.

At the same time, modem 60 receives a 4800 bps binary data stream from a data source 70. This data stream is scrambled, encoded and modulated to generate a far-end analog passband data signal r(t), the latter being transmitted to hybrid 40 via hybrid 50 and transmission channel 45.

The signal received from transmission channel 45 by hybrid 40 is not r(t) per se but a version thereof corrupted by (a) various forms of channel-induced distortion including Gaussian noise, intersymbol interference, phase jitter and frequency offset and (b) a so-called far echo $s^f(t)$ of signal s(t) caused, for example, by the inevitable impedance mismatch at the channel 45/hybrid 50 interface as well as by carrier system hybrid leaks at the far end of channel 45. The signal received by hybrid 40 is signal $r^{df}(t)$, the superscript "df" indicating corruption of the far end signal by distortion and far echo. That is, $r^{df}(t) = r(t) + s^f(t) + $ distortion. Signal $r^{df}(t)$ is routed by hybrid 40 from channel 45 onto inbound leg 121 of the near-end four-wire loop.

Due to the imperfect nature of hybrid 40, a portion of the energy of signal s(t) leaks onto inbound leg 121 along with signal $r^{df}(t)$. In addition, a portion of the energy of signal s(t) which is applied to channel 45 by hybrid 40 may be reflected back to hybrid 40 and thus onto lead 121 as the result of carrier system hybrid impedance mismatch within the near-end telephone company central office. The energy on lead 121 from such sources is referred to as near echo $s^n(t)$. The composite signal on inbound leg 121 is signal $r^{dfn}(t)$, the superscript "dfn" indicating corruption of the far end signal by distortion, for echo and near echo.

In the present illustrative embodiment, echo cancellation is performed in the digital domain. To this end, signal $r^{dfn}(t)$, after filtering in lowpass filter 122, is applied to A/D converter 123. The latter provides $1/T' = L/T$ samples per second, where L is selected such that $L/T$ is equal to at least the Nyquist rate of received signal $r^{dfn}(t)$. In this embodiment, in particular, A/D converter 123 operates at 9600 samples/second and since $T = 1/2400$ sec, then $L = 4$. A/D converter 123 generates a digital version of (lowpass filtered) analog signal $r^{dfn}(t)$, and, in particular, the $i^{th}$ sample thereof associated with the $m^{th}$ band interval is denoted $r_{m,i}^{dfn}$, the index i advancing at the Nyquist rate and taking on the values $0, 1 \ldots (L-1)$.

Sample $r_{m,i}^{dfn}$ is applied to one input of combiner 125. The other input to combiner 125 is echo replica sample $\hat{s}_{m,i}$ provided on lead 118. Sample $\hat{s}_{m,i}$ which is generated by echo canceller 117, is a sample of a replica of the echo energy in signal $r^{dfn}(t)$. The output signal of combiner 125, echo compensated signal sample $\hat{f}_{m,i}^{d}$, is thus equal to sample $r_{m,i}^{dfn}$ with the latter's echo energy at least substantially removed.

The output samples of combiner 125 are applied to D/A converter 136 and the resulting analog signal $\hat{f}^{d}(t)$ is applied to lowpass filter 138. The output signal of the latter, in turn, is applied to receiver 143. The receiver performs such functions as equalization, demodulation, slicing, decoding and descrambling to recover the binary data stream which originated at data source 70. Receiver 143 applies the recovered data stream to data sink 30.

In this embodiment, canceller 117 is comprised, in accordance with the present invention, of a pair of real bandpass filters. By "real" filter is meant a filter whose output signal is a function of a single input signal stream. (Prior art echo cancellers for data signals of this type, by contrast, utilize a so-called "cross-coupled," complex filter which provides a pair of output signals each of which is a function of a pair of input signal streams.)

In particular, the two real filters of the present illustrative embodiment respectively operate on rotated symbol components $a_m'$ and $b_m'$, of complex rotated symbols $A_m' = A_m e^{j\theta}$ where $\theta$ is a function of $\omega_c mT$ and, illustratively, is equal to that quantity. (The angle $\theta$ might alternatively also include, for example, a frequency offset correction term.) The real and imaginary components of the rotated symbols are thus respectively given by $$a_m' = a_m \cos(\theta) - b_m \sin(\theta)$$

$$b_m' = a_m \sin(\theta) + b_m \cos(\theta)$$

The rotated symbol components are provided to canceller 117 by multiplier 111. The latter's inputs are (a) real and imaginary symbol components $a_m$ and $b_m$, $m = 0, 1, 2 \ldots$, received from lead 103 and (b) the quantities $\cos(\omega_c mT)$ and $\sin(\omega_c mT)$ received from a local carrier source 109. As described in detail hereinbelow, the outputs of the two filters within canceller 117 are combined to form the echo replica samples on lead 118.

The theoretical underpinnings of the invention will not be explained. Assume, as is typical, that the highest frequency component in Nyquist pulse g(t) (Eq. (1)) is less than the carrier frequency, $\omega_c/2\pi$. In that case, the complex signal in brackets in Eq. (1) is an analytic signal $Z(t)$, where $$Z(t) = s(t) + j\tilde{s}(t) = \sum_m (a_m + jb_m)g(t - mT)e^{j\omega_c t} \quad (2)$$

and where $\tilde{s}(t)$ is the Hilbert transform of $s(t)$. Equation (2) can be rewritten as $$Z(t) = \sum_m (a_m + jb_m)e^{j\omega_c mT} g(t - mT)e^{j\omega_c(t-mT)} \quad (3)$$

$$= \sum_m (a_m' + jb_m')X(t - mT), \quad (4)$$

where
$$(a_m' + jb_m') = (a_m + jb_m)e^{j\omega_c mT} \quad (5)$$

and $$X(t) = g(t)e^{j\omega_c t} \quad (6)$$

Assume that the echo channel has an impulse response h(t). The analytic signal corresponding to the echo channel output signal is $$Z_1(t) = Z(t)*h(t) = \sum_m (a_m' + jb_m')X_1(t - mT) \quad (7)$$

where the asterisk (*) denotes convolution, where
$$X_1(t) = X(t)*h(t) \quad (8)$$

and where $Z_1(t)$ and $X_1(t)$ are analytic signals. The actual signal at the output of the echo channel is the real part of $X_1(t)$, i.e., $$s_1(t) = \sum_m [a_m' x_1(t - mT) - b_m' \tilde{x}_1(t - mT)], \quad (9)$$

where $X_1(t) = x_1(t) + j\tilde{x}_1(t)$.

Since the task of canceller 117 is to generate a replica of the echo energy in the received signal (in this embodiment, more precisely, a digital version thereof) Eq. (9) shows that, as previously described, canceller 117 may be indeed comprised of a pair of real bandpass filters respectively operating on rotated symbol components $a_m'$ and $b_m'$, $m = 0, 1, 2 \ldots$, with the output signals of the two filters being combined. As indicated by Eq. (9), the respective impulse responses of the two filters are $x_1(t)$ and $-\tilde{x}_1(t)$.

Figure 2:
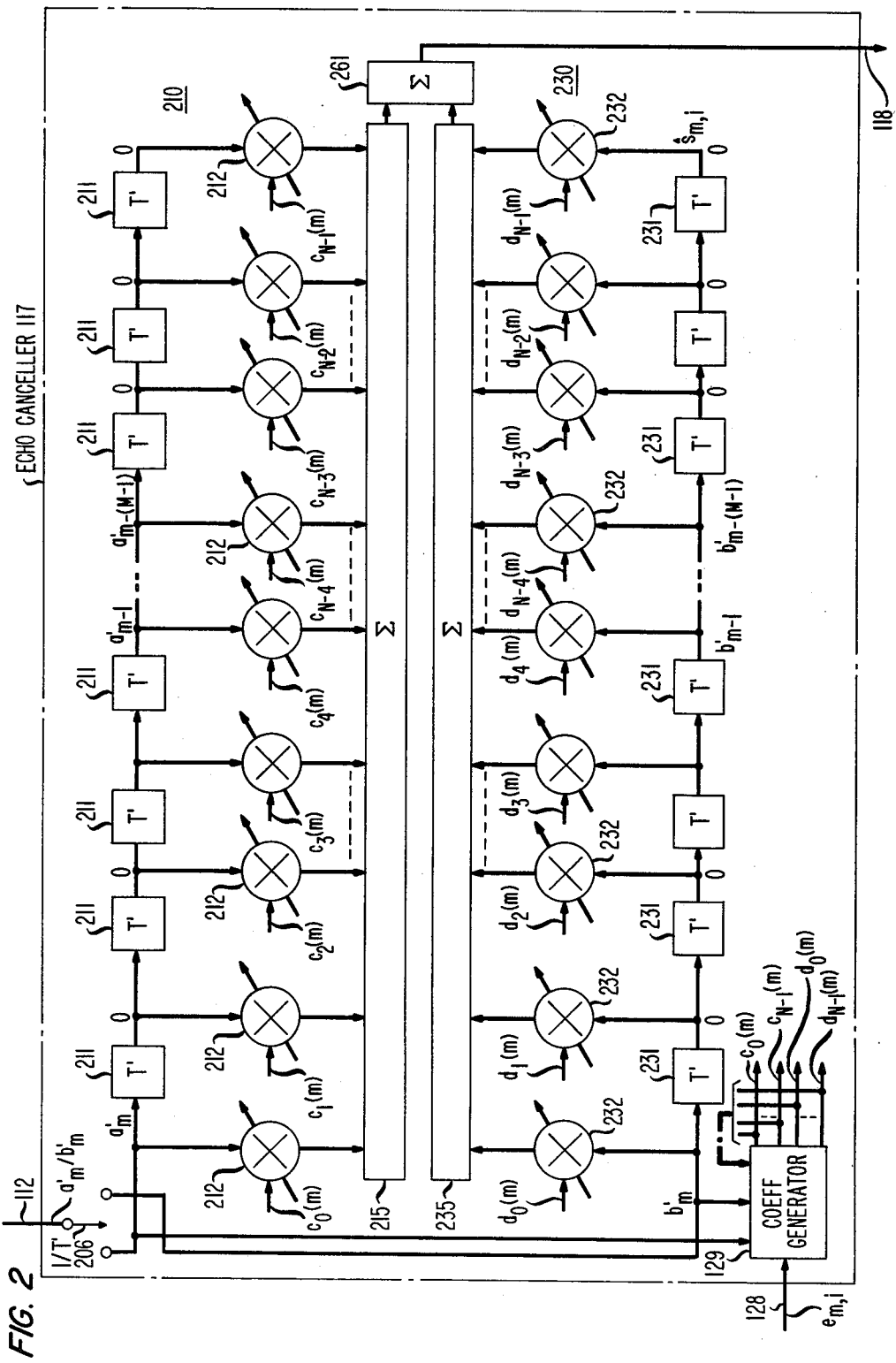
FIGS 2–5 are block diagrams of respective illustrative embodiments of the echo canceller used in the system of FIG. 1.

In the present illustrative embodiment, the two bandpass filters of canceller 117 are respective digital transversal filters whose tap coefficients are the sampled values $x_1(kT')$ and $-\tilde{x}_1(kT')$, where $k = 0, \pm 1, \pm 2, \ldots$ and where T is as previously defined. As shown in FIG. 2, the two transversal filters, denoted 210 and 230, may be implemented with respective tapped delay lines. The delay line of filter 210 is comprised of N delay sections 211. The delay line of filter 230 is comprised of N delay sections 231. Each delay section provides a delay of T' seconds so that the total (time) span of the delay line is NT' seconds. Since, as previously defined, $1/T' = L/T$, the span of the delay line is $M = N/L$ symbol periods. The real (imaginary) rotated symbol components $a_m'(b_m')$, $m=0, 1, 2 \ldots$ are applied to filter 210 (230) via switch 206. The latter operates at a rate of $L/T = 1/T' = 9600$ Hz. The rotated symbol components are assumed to be present at the switch inputs only momentarily so that the delay lines of filters 210 and 230 are only sparsely filled. That is, only every $L^{th}$ delay line section of filter 210 (230) contains a real (imaginary) rotated symbol component; the intervening (L-1) sections each contain a zero. Thus, at any one time, filter 210 contains the M real rotated symbol components, $a_m', a_{m-1}' \ldots a_{m-(M-1)}'$ and filter 230 contains the M imaginary rotated symbol components $b_m', b_{m-1}' \ldots b_{m-(M-1)}'$.

Associated with the delay sections 211 (231) of filter 210 (230) are multipliers 212 (232). Each multiplier of each filter multiplies the tap signal presented to it by a respective coefficient. The outputs of multipliers 212 are combined in combiner 215 once every $T'$ seconds. The outputs of multipliers 232 are similarly combined once every $T'$ seconds in combiner 235. The outputs of combiners 215 and 235 are combined in combiner 261. The $i^{th}$ output of combiner 261 associated with the $m^{th}$ baud interval is echo replica sample $s_{m,i}$ and it will be appreciated from the foregoing that echo canceller 117 forms each echo replica sample by forming a weighted sum of the rotated real and imaginary data symbol components.

As indicated in FIG. 2, multipliers 212 and 232 are variable. That is, the value of the coefficient by which each multiplier multiplies the tap signal applied to it is time-variable. In particular, each coefficient has a value associated with the $m^{th}$ baud interval. The ensemble of tap coefficients used in filter 210 are denoted $c_0(m), c_1(m) \ldots c_{N-1}(m)$. The ensemble of tap coefficients used in filter 230 are denoted $d_0(m), d_1(m) \ldots d_{N-1}(m)$. The coefficient values, and thus the filter transfer characteristics, are updated once per baud interval in response to an error signal on lead 128 in such a way that, over time, the echo energy in the echo compensated signal, i.e., the output signal of combiner 125, is minimized. In particular, the updated coefficient values are generated by a coefficient generator 129, which receives as inputs the error signal $e_{m,i}$, the rotated symbol components $a_m'$ and $b_m'$ and the previously generated coefficients and generates the updated coefficients in response thereto. The particular manner in which the coefficient values may be updated by coefficient generator 129 will not be further described herein. Coefficient updating is discussed, however, in connection with the embodiments described below.

Figure 3:
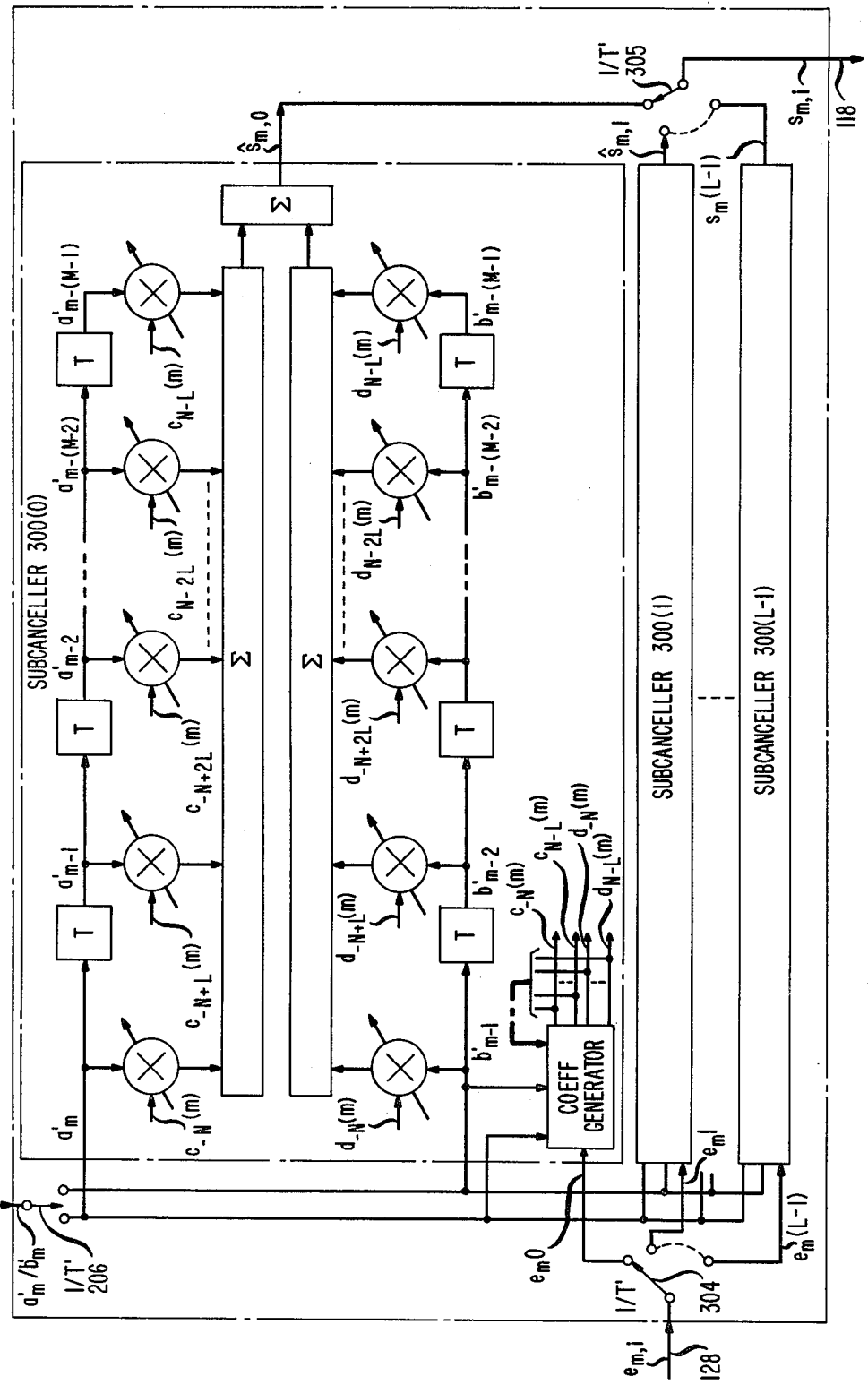

The embodiment of FIG. 2, although operative, is inefficient in that L-1 out of every L multiplications is a multiplication by zero. An equivalent, but more efficient, structure is shown in FIG. 3. This structure takes advantage of the fact that, in each baud interval, L different subsets of coefficients multiply the same M rotated symbol components to provide L respective digital echo replica samples. This being so, canceller 117 can be comprised of L "subcancellers" 300(i), $i=0, 1, \ldots (L-1)$, as shown in FIG. 3. Each subcanceller, in turn, is comprised of a pair of tapped delay lines whose delay sections each provide a delay T. One delay line of each subcanceller receives the real rotated symbol components $a_m'$, $m=0, 1, 2 \ldots$ and the other receives the imaginary rotated symbol components $b_m'$, $m=0, 1, 2 \ldots$ Since the delay sections each provide a delay T, each delay line is filled with rotated symbol components, i.e., there are no zero entries. The coefficients in the $i^{th}$ subcanceller are a first ensemble of coefficients $c_{kL+i}(m)$, $k=0,1 \ldots (M-1)$, and a second ensemble of coefficients $d_{kL+i}(m)$, $k=0, 1, 2 \ldots (M-1)$. By way of example, the structure of subcanceller 300(0) is shown explicitly in FIG. 3.

The L echo replica digital samples generated in each baud interval by the L subcancellers are provided on lead 118 via switch 305 and the processing performed within the echo canceller of FIG. 3 to generate them can be expressed as $$s_{m,i} = \sum_{k=0}^{(M-1)} [a'_{m-k} c_{kL+i}(m) + b'_{m-k} d_{kL+i}(m)], \quad (10)$$

$i = 0, 1 \ldots (L-1)$

Attention is now redirected to FIG. 1. Echo compensated signal sample $\hat{r}_{m,i}$ contains not only energy derived from the far-end passband data signal but also uncancelled echo energy resulting from differences between echo replica sample $\hat{s}_{m,i}$ and echo energy in A/D converter 123 output sample $r_{m,i}^{d/n}$. As a consequence, echo compensated signal sample $\hat{r}_{m,i}$ can be used to form an error signal sample in response to which the coefficient values, and thus the transfer function, of canceller 117 are updated. The error signal sample, which is this embodiment is identical to echo compensated signal sample $\hat{r}_{m,i}$, is denoted $e_{m,i}$ and is provided to canceller 117 on lead 128. The coefficients used in any particular subcanceller of FIG. 3, should be updated in response to error signal samples which resulted when echo replica samples generated by that subcanceller were applied to combiner 125. To this end, each error signal sample is applied to the appropriate subcanceller in FIG. 3 by a switch 304.

In the embodiment of FIG. 3, the coefficients in canceller 117 are adapted in accordance with relations $$c_{kL+i}(m+1) = c_{kL+i}(m) + \alpha a_{m-k} e_{m,i}' \quad (11)$$

$$d_{kL+i}(m) = d_{kL+i}(m) + \alpha b_{m-k} e_{m,i}' \quad (12)$$

thereby implementing the so-called stochastic least-mean-square algorithm. In these expressions, $\alpha$ is a selected step size meeting the criterion $0 < \alpha < 1/2NA$ where A is the variance of the data symbols and is equal to the sum of the squares of all possible real (or imaginary) symbol component values divided by the total number of such values. (In this embodiment, $A=1$.) The optimum value of $\alpha$ i.e., the value which provides the fastest convergence to the steady-state mean squared error, is half the maximum step size. That is, $\alpha_{opt} = 1/4NA \quad (13)$ As in the embodiment of FIG. 2, the updated coefficient values are generated within each subcanceller by a coefficient generator 129.

From Eqs. 10, 11 and 12 it can be seen that the real passband filtering operation performed in near canceller 117 requires approximately 4LM multiplications and an equal number of additions in each symbol interval. Advantageously, this is only half the number of arithmetic operations required in prior art echo cancellers. This is because in the latter, the echo replica filtering is carried out at baseband utilizing a complex, "cross-coupled" structure in which, for both echo replica generation and coefficient updating, each data symbol component is multiplied by each of two coefficients, rather than one as in the present invention.

Figure 4:
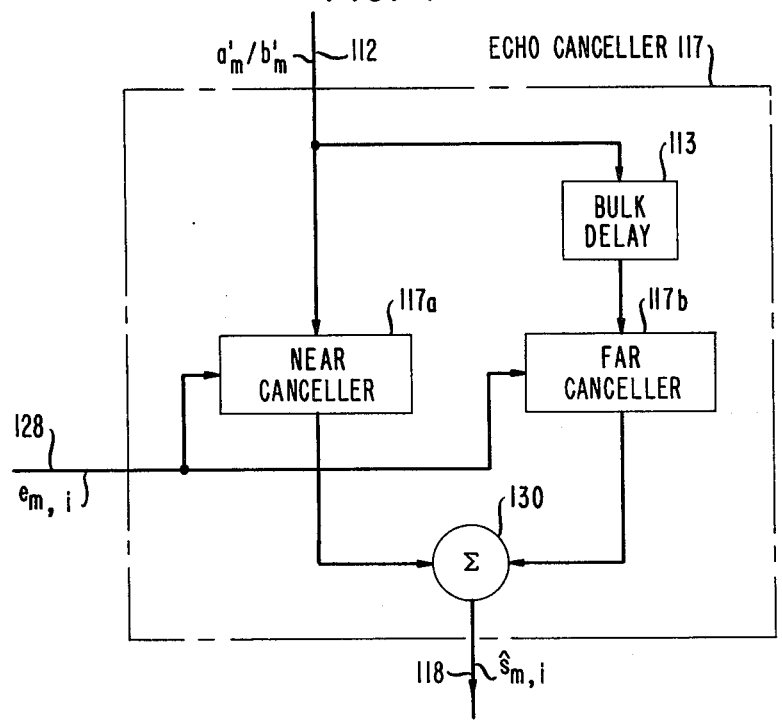

It may also be noted at this point that there is typically a substantial time gap (e.g., 5-55 ms) between the termination of the near echo resulting from a particular transmitted data symbol and the initiation of the far echo resulting from the same transmitted symbol. As a result, many of the tap coefficients in the embodiments of FIGS. 2 and 3 will always be zero. This is, of course, inefficient. As shown in FIG. 4, a more efficient approach is to divide canceller 117 into a near canceller 117a and a far canceller 117b and to feed the latter with rotated symbols which have been delayed in a bulk delay unit 113. The delay imparted by the latter is set during echo canceller start-up to be approximately equal to the time required for the symbols on lead 103 (FIG. 1) to traverse the far echo path. The outputs of the near and far echo cancellers are combined in a combiner 130, the output lead of which is echo canceller output lead 118.

Echo cancellers 117a and 117b may each be substantially identical to the embodiments of, for example, FIGS. 2 or 3 except, of course, that the values of M and N (discussed above) for the near and far echo cancellers—denoted $M_n$ and $N_n$ for the near canceller and $M_f$ and $N_f$ for the far canceller—will be different from the values of M and N for a single canceller which handles both the near and far echoes. Illustratively, $M_n=14$, $N_n=56$ for near canceller 117a and $M_f=60$, $N_f=240$ for far canceller 117b.

The processing performed by the echo canceller of FIG. 4 may be expressed as $$\hat{s}_{m,i} = \sum_{k=0}^{(M_n-1)} [a'_{m-k}c_{kL+i}(m) + b'_{m-k}d_{kL+i}(m)] + \sum_{k=\Delta}^{(M_f-1)} [a'_{m-k}c_{kL+i}(m) + b'_{m-k}d_{kL+i}(m)] \quad (14)$$

where $\Delta$ is the baud interval delay imparted by bulk delay 113. The first summation in Eq. 14 represents, of course, the processing performed by near canceller 117a while the second summation represents the processing performed by far canceller 117b. It will be appreciated that the expression for $\hat{s}_{m,i}$ in Eq. 14 is equivalent to that of Eq. 10 with certain of the coefficients in the latter being zero, viz., $c_{kL+i}(m)=d_{kL+i}(m)=0$ for $k=M_n, (M_n+1)\ldots(\Delta-1)$.

Adaption of the tap coefficients for near canceller 117a is given by the relations $$c_{kL+i}(m + 1) = c_{kL+i}(m) + a_n a'_{m-k}e_{m,i} \quad (15)$$

$$d_{kL+i}(m + 1) = d_{kL+i}(m) + a_n b'_{m-k}e_{m,i}$$

$$k = 0, 1 \ldots (M_n - 1)$$

where the step size $a_n$ meets the criterion $$0 < a_n < \frac{1}{2N_nA}, \quad (16)$$

and has an optimum value for convergence given by $$a_{nopt} = \frac{1}{4N_nA}, \quad (17)$$

Similarly, adaptation of the tap coefficients for far canceller 117b is given by the relations $$c_{kL+i}(m + 1) = c_{kL+i}(m) + a_f a'_{m-k}e_{m,i} \quad (18)$$

$$d_{kL+i}(m + 1) = d_{kL+i}(m) + a_f b'_{m-k}e_{m,i}$$

$$k = \Delta, (\Delta + 1) \ldots (M_f - 1)$$

where the step size $a_f$ meets the criterion $$0 < a_f < \frac{1}{2N_fA}, \quad (19)$$

and has an optimum value for convergence given by $$a_{fopt} = \frac{1}{4N_fA}. \quad (20)$$

Figure 5:
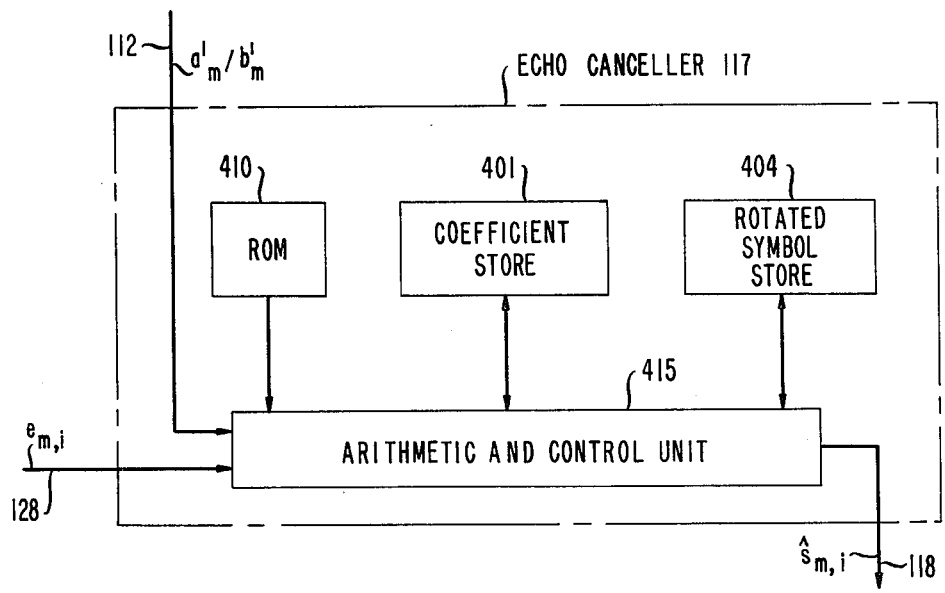

Another embodiment of echo canceller 117 is shown in FIG. 5. This embodiment is probably the one that would be used in a commercial realization of the invention. This embodiment of canceller 117 includes coefficient store 401, rotated symbol store 404, and arithmetic and control unit 415. The latter operates in response to microcoded instructions stored in read-only memory (ROM) 410. In particular, unit 415 receives each new real and imaginary rotated symbol component from lead 112 and stores it in store 404. It thereafter generates L echo replica samples by reading the appropriate rotated symbol components and coefficients from stores 404 and 401, respectively, and performing the processing defined by Eq. 14. Arithmetic and control unit 415 also receives error signal sample $e_{m,i}$ from lead 128 and updates each coefficient value in each symbol interval in accordance with Eqs. 15 and 18. Realization of the embodiment of FIG. 5 is well within the ability of those skilled in the art and thus further detail relative thereto is not necessary. It may be noted, however, that unit 415 could be realized, for example, as a special purpose LSI circuit or a microprocessor.

In selecting appropriate parameters to achieve a desired signal-to-noise ratio (SNR) for cancellation of the far echo, the following equation may be used:

$$SNR = \frac{1 - a_f N_f A}{a_f N_f A + (P_1/P_s)\Phi_{max}^2 + P_u/P_s} \quad (21)$$

where $a_f$, $N_f$ and A are as defined above,
$P_1$=power of the near echo signal (before cancellation)
$P_s$=power of the far end data signal (before cancellation) $P_u$=any other uncorrelated signal, e.g., gaussian noise $\Phi_{max}^2$=square of maximum anticipated phase jitter (measured in radian$^2$)

(A similar expression obtains for cancellation of the near echo with the term $(P_1/P_s) \Phi_{max}^2=0$, since there is no phase jitter in the near echo.) This equation assumes that the canceller operates with infinite precision, which of course is not realistic. In actuality, the best achievable SNR for a given order of digital precision is $$SNR = \frac{P_s}{(N_nA)(LSB)} \quad (22)$$

where LSB is the value of the least significant bit in the digital representation used in the echo canceller. Eq. 22 assumes a system with no channel impairments which, of course, is also not realistic. As a matter of practical design, however, Eqs. 21 and 22 can be used to design the echo canceller by choosing the parameters such that the SNR figure yielded by these equations is somewhat larger than that actually desired. In a system which was actually built and tested—a system in which $\alpha_n = 2^{-14}$, $\alpha_f = 2^{-14}$, $N_n = 16$, $N_f = 32$. $A = 1$, $LSB = 2^{-23}$, $\Phi_{max} = 10$ degrees ($\pi/36$ radians) peak-to-peak and $P_u$ is negligible—a composite SNR of 21.5 dB was achieved.

Start-up of the echo cancellation system of FIG. 1 can be achieved by first using any of several known techniques to estimate the round trip delay in the far echo channel in order to determine $\Delta$ (Eq. 14); setting all of the coefficients to zero; transmitting a random or pseudorandom symbol sequence; and letting the coefficients adapt using $\alpha_{opt}$ (Eq. 13) with $N = N_n + N_f$. Using this start-up technique in the system that was built and tested, an echo canceller start-up time of about 3 seconds was achieved.

An alternative approach to adapting the coefficients in start-up might be to freeze the coefficients associated with cancellation of the far echo (i.e., the coefficients in Eq. 14 for which $k = \Delta, (\Delta+1)...(M_f-1)$; let the other, near cancellation, coefficients adapt using $\alpha_{nopt}$; once the level of the near echo reaches that of the far echo (the required time period being determinable experimentally or by calculation during echo canceller design assuming worst case conditions), continue adapting the near cancellation coefficients, but use that value of $\alpha_n$ which provides the desired SNR; when the near echo is 20 dB below the far echo (the time period required for this again being determinable during echo canceller design assuming worst case conditions), begin adapting the far echo cancellation coefficients using $\alpha_{fopt}$; once the far echo is at the level of the near echo, switch adaptation of the far echo cancellation coefficients to the value of $\alpha_f$ which provides the desired SNR.

Another design consideration is frequency offset. My analysis shows that performance of the echo canceller is deleteriously affected by even moderate amounts of frequency offset. Accordingly, in applications where frequency offset is anticipated, appropriate corrective measures within the modem should be taken. See, for example, S. B. Weinstein, "A Passband Data-Driven Echo Canceller for Full-Duplex Transmission on Two-Wire Circuits," *IEEE Trans. on Communications*, July 1977, pp. 226-247. As previously noted, the parameter $\theta$ in the expressions for $a_m'$ may include a frequency offset correction term.

As previously noted, at the heart of the present invention is my recognition that data signal echo replicas can be generated at passband rather than being generated at baseband and then modulated into the passband. The invention thus encompasses not only conventional double sideband-quadrature carrier systems but other passband systems as well. Thus, for example, although in the present illustrative embodiment, transmitted data signal s(t) has the form shown in Eq. 1, a passband data signal s'(t) of the form $$s'(t) = Re\left[\sum_m (a_m + jb_m)g(t - mT)e^{j\omega_c(t-mT)}\right]$$

could be transmitted instead. In that case, the echo cancellers should be provided with unrotated symbol components $a_m$ and $b_m = 0, 1...$ rather than rotated symbol components $a_m'$ and $b_m'$, $m = 1, 2...$ The invention is also applicable to such other modulation schemes as amplitude, phase, and differential phase modulation and combinations of same. (QAM is, of course, a combined amplitude and phase modulation method.)

It may also be noted that an echo canceller embodying the principles of the present invention can be implemented using, for example, a) coefficient adaptation algorithms other than those described herein, b) circuitry which operates at least in part in the analog domain, sampled (staircase) domain or other signal domains and c) real (as opposed to complex) data symbols.

Moreover, although the invention is disclosed herein in the context of a canceller which generates echo replica samples at the Nyquist rate, it is equally applicable to cancellers which generate the echo replica samples at the baud rate, such as the arrangement disclosed by K. H. Mueller in *IEEE Trans. on Communications*, September 1976, pp. 956-962 and in U.S. Pat. No. 4,087,654 issued May 2, 1978. In such an application of the present invention $L = 1$.

Moreover, although the invention is illustrated herein in the context of a data transmission system in which each data symbol is two-dimensional and extends over only one baud interval, it is equally applicable to system in which each symbol has more than two dimensions and/or extends over two or more baud intervals such as the system disclosed in U.S. Pat. No. 4,084,137 issued Apr. 11, 1978 to G. R. Welti.

It will thus be appreciated that those skilled in the art will be able to devise numerous arrangements which, although not explicitly shown or described herein, embody the teachings of my invention.

What is claimed is:

1. Echo cancellation apparatus for use in conjunction with circuitry adapted to transmit a double sideband-quadrature carrier signal representing a stream of complex data symbols occurring at a rate of 1/T, said circuitry being further adapted to receive a signal which includes at least a first echo of said transmitted signal, said echo cancellation apparatus comprising means for forming at least a first echo replica sample during each of a succession of T second intervals, each echo replica sample being formed by forming, in response to signals equal to the real and imaginary components of said complex data symbols, a weighted sum of rotated versions of said real and imaginary components, the weighted sum formed during any particular one of said T second intervals being a function of the sum of the products of each said rotated version with a respective one of and ensemble of coefficients associated with said one of said intervals, means for combining each of the echo replica samples with a respective sample of said received signal to form a plurality of echo compensated samples, and means for determining the values of said coefficients in response to at least ones of said echo compensated samples and at least ones of said rotated versions.

2. The invention of claim 1 wherein the rotated version of the $m^{th}$ of said real components is generated as a function of signals equal to $a_m \cos(\theta)$ and $b_m \sin(\theta)$ and the rotated version of the $m^{th}$ of said imaginary components is generated as a function of signals equal to $a_m$ $\sin(\theta)$ and $b_m \cos(\theta)$, where $a_m$ and $b_m$ are said $m^{th}$ real and imaginary components, respectively, $\theta$ is a predetermined function of the quantity $\omega_c mT$, and $\omega_c$ is the radian carrier frequency of said transmitted signal.

3. The invention of claim 2 wherein the rotated versions of said $m^{th}$ real and imaginary components are equal to respective ones of the quantities $[a_m \cos(\theta) - b_m \sin(\theta)]$ and $[a_m \sin(\theta) + b_m \cos(\theta)]$.

4. The invention of claim 3 wherein $\theta = (\omega_c mT)$.

5. Echo cancellation apparatus for use in conjunction with circuitry which transmits a passband signal representing data symbols each having a first component and a second component and which receives a signal which includes at least a first echo of said transmitted signal, said apparatus comprising
first and second real filters,
means for generating in response to said first and second data symbol components rotated versions thereof and for applying said rotated versions to said first and second filters, respectively,
means for combining the outputs of said filters with said received signal to form an echo compensated signal, and
means for updating the transfer characteristics of said filters in response to said echo compensated signal and said rotated versions in such a way that, over time, energy in said echo compensated signal derived from said echo is minimized.

6. The invention of claim 5 wherein the rotated version of the $m^{th}$ of said first components is generated as a function of signals equal to $a_m \cos(\theta)$ and $b_m \sin(\theta)$ and the rotated version of the $m^{th}$ of said second components is generated as a function of signals equal to $a_m \sin(\theta)$ and $b_m \cos(\theta)$, where $a_m$ and $b_m$ are said $m^{th}$ of said first and second components, respectively, $\theta$ is a predetermined function of the quantity $\omega_c mT$, and $\omega_c$ is the radian carrier frequency of said transmitted signal.

7. The invention of claim 6 wherein the rotated versions of said $m^{th}$ of said first and second components are equal to respective ones of the quantities $[a_m \cos(\theta) - b_m \sin(\theta)]$ and $[a_m \sin(\theta) + b_m \cos(\theta)]$.

8. The invention of claims 2, 6 or 7 wherein $\theta = (\omega_c mT)$.

9. Echo cancellation apparatus for use in conjunction with circuitry which transmits a passband signal representing first and second pluralities of data symbol components and which receives a signal which includes at least a first echo of said transmitted signal, the components of each plurality occurring at T second baud intervals, said apparatus comprising
means for forming L echo replica samples associated with each baud interval, L being a selected integer, the $i^{th}$ of the L echo replica samples associated with the $m^{th}$ baud interval including at least the term $$\hat{s}_{m,i} = \sum_{k=0}^{(M-1)} a'_{m-k} c_{kL+i}(m) + b'_{m-k} d_{kL+i}(m)$$

where M is a selected integer, $a'_m$ is a rotated version of the $m^{th}$ component of at least said first plurality, $b'_m$ is a rotated version of the $m^{th}$ component of at least said second plurality, $c_{kL+i}(m)$ is the $kL^{th}$ one of a first ensemble of tap coefficients associated with said $i^{th}$ echo replica samples, and $d_{kL+i}(m)$ is the $kL^{th}$ one of a second ensemble of tap coefficients associated with said $i^{th}$ echo replica sample,
means for combining $\hat{s}_{m,i}$ with a respective sample of the received signal to form an echo compensated signal sample $\hat{r}_{m,i}^d$, and
means for determining the values of said coefficients in accordance with $$c_{kL+i}(m+1) = c_{kL+i}(m) + \alpha a'_{m-k} e_{m,i}$$

$$d_{kL+i}(m+1) = d_{kL+i}(m) + \alpha b'_{m-k} e_{m,i}$$

where $e_{m,i}$ is an error signal which is a function of $\hat{r}_{m,i}^d$ and where $\alpha$ is a selected step size.

10. The invention of claim 9 wherein L is selected such that L/T is equal to at least the Nyquist frequency of the received signal.

11. The invention of claim 9 further including means for generating $a'_m$ as a function of signals equal to $a_m \cos(\theta)$ and $b_m \sin(\theta)$ and for generating $b'_m$ as a function of signals equal to $a_m \sin(\theta)$ and $b_m \cos(\theta)$, where $a_m$ is said $m^{th}$ component of said first plurality, $b_m$ is said $m^{th}$ component of said second plurality, $\theta$ is a predetermined function of the quantity $(\omega_c mT)$, and $\omega_c$ is the radian carrier frequency of the transmitted signal.

12. The invention of claim 9 further including means for generating $a'_m$ by forming a signal equal to the difference between $a_m \cos(\theta)$ and $b_m \sin(\theta)$ and for generating $b'_m$ by forming a signal equal to the sum of $a_m \sin(\theta)$ and $b_m \cos(\theta)$, where $a_m$ is said $m^{th}$ component of said first plurality $b_m$ is said $m^{th}$ component of said second plurality $\theta$ is a predetermined function of the quantity $(\omega_c mT)$, and $\omega_c$ is the radian carrier frequency of the transmitted signal.

13. The invention of claims 11 or 12 wherein $\theta = (\omega_c mT)$.

14. The invention of claim 9 wherein $e_{m,i} = r_{m,i}^d$.

* * * * *